(12) United States Patent
Hirano

(10) Patent No.: US 6,594,528 B1
(45) Date of Patent: Jul. 15, 2003

(54) SUPERVISORY AND CONTROL SUPPORT EQUIPMENT

(75) Inventor: Keizo Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/545,101

(22) Filed: Apr. 6, 2000

(30) Foreign Application Priority Data

Jul. 21, 1999 (JP) .......................................... 11-206658

(51) Int. Cl.$^7$ .............................................. G05B 19/18
(52) U.S. Cl. ............................ 700/9; 702/181; 702/56; 702/184; 702/185; 714/7; 705/2
(58) Field of Search ......................... 702/181, 56, 184, 702/185; 714/7; 705/2; 700/9

(56) References Cited

U.S. PATENT DOCUMENTS

| | | | | | |
|---|---|---|---|---|---|
| 4,985,857 A | * | 1/1991 | Bajpai et al. | ................ | 702/184 |
| 5,237,508 A | * | 8/1993 | Furukawa et al. | .......... | 700/100 |
| 5,251,151 A | * | 10/1993 | Demjanenko et al. | ........ | 702/56 |
| 5,305,235 A | * | 4/1994 | Izui et al. | .................... | 702/185 |
| 5,594,426 A | * | 1/1997 | Ushijima et al. | ....... | 340/825.02 |
| 5,710,723 A | * | 1/1998 | Hoth et al. | ................... | 702/181 |
| 5,997,476 A | * | 12/1999 | Brown | ........................... | 705/2 |
| 6,058,489 A | * | 5/2000 | Schultz et al. | .................. | 714/7 |
| 6,073,054 A | * | 6/2000 | Katayama et al. | ............. | 700/28 |
| 6,101,419 A | * | 8/2000 | Kennedy et al. | ................ | 700/3 |

\* cited by examiner

Primary Examiner—Ramesh Patel
Assistant Examiner—Thomas Pham
(74) Attorney, Agent, or Firm—Katten Muchin Zavis Rosenman

(57) ABSTRACT

A supervisory and control support equipment characterized in performing a supervision and control of a plurality of facilities, writing information generated during the procedure of the processing, achieving the supervision and control and respectively corresponding to the facilities, to a secondary storage through a cache memory and saving the information held in the cache memory in an external storage when a predetermined event is recognized during the procedure of the processing. In the supervision and control system applying the above supervisory and control support equipment, it is possible to achieve continuation or resume of operations with high certainty and efficiency without changing a configuration of hardware.

29 Claims, 8 Drawing Sheets

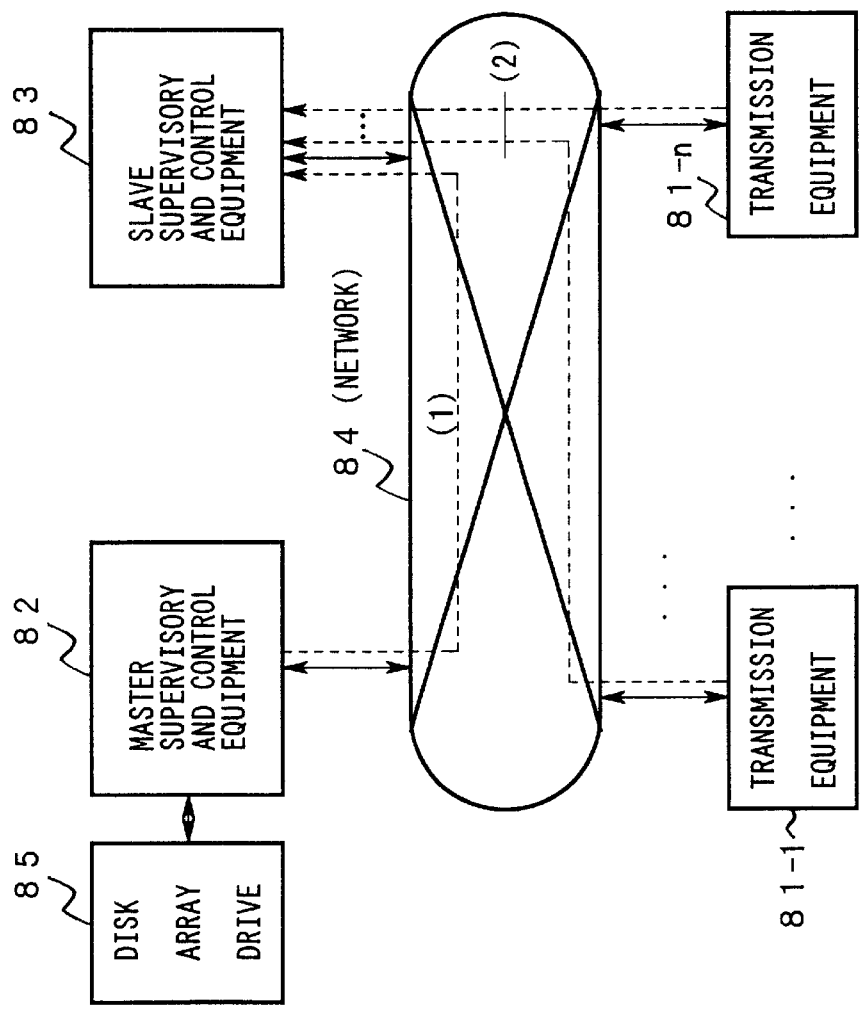
PRIOR ART FIG. 7

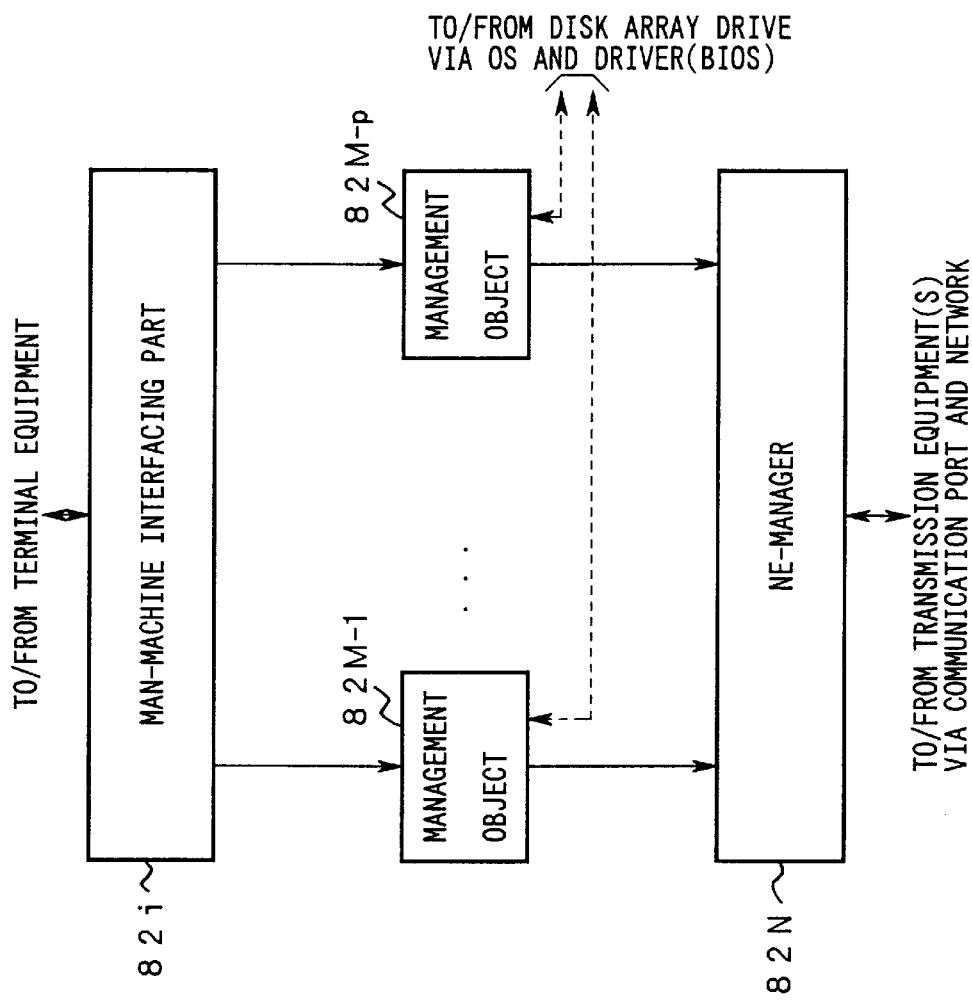

SUPERVISORY AND CONTROL SUPPORT EQUIPMENT

BACKGROUND OF THE INVENTION

1. Field of the Invention

The present invention relates to a supervisory and control support equipment realizing supervision and control by collecting information concerning operations and maintenance and processing the information with respect to a desired facility.

2. Description of the Related Art

In recent years, high-developed information processing technology and transmission technology is applied to many communication equipments.

Among such communication equipments, a transmission equipment which is installed at a geographically remote secluded location, unattended continuous running and preventive maintenance is achieved by pertinently informing connected lines and status of equipped packages to a centralized supervision and control center located at a remote place.

In a transmission equipment connected to a transmission channel of a trunk line system, it is required that the supervision and control can be continued even in the case in which serious disaster such as earthquake or conflagration occurs.

Therefore, in the procedure of maintenance and operations of these transmission equipments, updated or generated important information is downloaded pertinently to the centralized supervision and control center along with office data via a communication link, by achieving duplication, general reliability is highly maintained.

FIG. 7 is a diagram showing a configuration example of a conventional supervision and control system.

In the drawing, transmission equipments 81-1 through 81-n, a master supervisory and control support equipment 82, and a slave supervisory and control support equipment 83 are connected to a network 84. Disk array drive 85 is connected to the master supervisory and controls support equipment 82.

As shown in FIG. 8, the master supervisory and control support equipment 82 is integrated with software comprising:

a man-machine interfacing part 82*i* for constituting a man-machine interfacing part with operators engaged with maintenance and operations via terminal apparatus, not illustrated;

an NE-manager 82N mutually transmitting and receiving predetermined messages to and from transmission equipments 81-1 through 81-n opposed thereto via communication ports and the network 84; and management objects 82M-1 through 82M-p for holding and updating information concerning supervision and control and performing a predetermined processing to be carried out with the information as an operand in an unit of all or any of the transmission equipments 81-1 through 81-n or subsystems, frames, shelves, modules constituting these transmission equipments 81-1 through 81-n and achieving to distribute predetermined function and load.

Furthermore, among the above-described subsystems, frames, shelves and modules, those components of processing individually performed by the management objects 82M-1 through 82M-p, are simply referred to as "objects" in the following.

In the procedure of supervision and control of the transmission equipments 81-1 through 81-n, basic procedures and operands of processings performed in cooperation with the man-machine interfacing part 82-1, the NE-manager 82N and the management objects 82M-1 through 82M-p, have no relation to do with the invention and accordingly, an explanation thereof will be omitted here.

In FIG. 8, an arrow mark of a solid line signifies that a task or a management object corresponding to a front edge of the arrow mark is invoked with information or event generated by a management object or a task corresponding to a starting point of the arrow mark as a starting factor.

An operating system installed to the master supervisory and control support equipment 82 performs storage management of a storage area of the disk array drive 85.

The disk array drive 85 is stored, according to the storage management, with supervision and control information applied to any of line supervisory and control, equipment supervisory and control, centralized supervision and control and preventive maintenance configured by both or either one of;

information previously given as office data or subscriber data; and generated or updated information in the procedure of maintenance and operations;

with regard to an individual object at a predetermined period.

Furthermore, the disk array drive 85 parallelly holds supervisory control information to be given and written or updated by the master supervisory and control support equipment 82 to duplicated storage media as described below.

In the disk array drive 85, there is controlled a system configuration of two storage areas redundantly configured at storage media by a unit of either of a truck or a sector formed by partitioning the storage media.

In the disk array drive 85, a storage area to become an object of reading information is selected by a unit of a medium, a truck or a sector which is actively used under the above-described system configuration.

Therefore, the supervisory control information is redundantly stored to the disk array drive 85 based on the active redundancy system and is pertinently read therefrom.

Meanwhile, the slave supervisory and control support equipment 83 is located at a site remote geographically from a site where the master supervisory and control support equipment 82 is located to a degree by which influence of serious disaster, mentioned above, is avoided by a desired certainty.

Moreover, the master supervisory and control support equipment 82 downloads backup the information to be applied to backup information stored in the disk array drive 85, as mentioned above, to the slave supervisory and control support equipment 83 via the network. 84 at a predetermined frequency.

The transmission equipments 81-1 through 81-n download the updated information (hereinafter referred to as "quasi-backup information") in the process (including channel control, call processing and fluctuation in traffic) of maintenance and operations to the slave supervisory and control support equipment 83 via the network 84 by a predetermined procedure or at a predetermined frequency.

The slave supervisory and control support equipment 83 holds backup information and quasi-backup information downloaded in this way to a predetermined external storage.

Furthermore, these information is applied in the case in which supervisory control information redundantly stored to the disk array drive 85 is not applicable to continuation of recovery and operation of the system owing to failure or disaster which actually occurs.

Meanwhile, according to the above-described conventional example, the backup information on the quasibackup information are downloaded to the slave supervisory and control support equipment 83 asynchronously.

Therefore, backup information generated by combining the quasi-backup information to the backup control information in failure or disaster which occurs actually, is not necessarily equal to the latest supervisory control information stored at the disk array drive 85. (Here, the backup information above is generated, for instance, by the slave supervisory and control support equipment 83 that performs the dedicated tool(s).)

Therefore, application thereof has not been permitted in order to regularly achieve continuation or recovery of operation mentioned above, unless the backup control information is properly edited manually, However, in generating such a backup control information, generally, many man-hours are needed because much of trials and errors are accompanied, even when the above-described tool is utilized.

Therefore, in recovering the transmission equipments 81-1 through 81-n, there is a high possibility of requiring an extremely long time.

SUMMARY OF THE INVENTION

It is an object of the invention to provide a supervisory and control support equipment achieving continuation or resume of operations with high certainty and efficiency without changing the configuration of hardware.

It is another object of the invention to save labor and achieve a reduction in running cost relevant to its maintenance and operations of a supervision and control system and enhance availability and practicability along with reliability of the supervision and control system without substantially changing the configuration of hardware and software in comparison with the conventional example.

It is another object of the invention to save supervisory control information in an external storage with high certainty and efficiency even during a period in which a storage means is not normally operated.

It is another object of the invention to improve service quality along efficiency and flexibility of work relevant to its maintenance and operations.

It is another object of the invention to achieve simplification of the structure of software.

It is another object of the invention to improve flexibility in variations of configurations of a system, which becomes an object of supervision and control.

It is another object of the invention to achieve high degree of modularization and improve reliability along with flexibility in changing the configuration of a monitoring system to which the present invention is applied.

It is another object of the invention to avoid interruption of supervision and control due to a failure and promptly achieve reconfiguration of the system with high certainty when recovered from the failure.

It is another object of the invention that a facility in which a failure occurred promptly becomes the object of supervision and control with high certainty when the facility recovers from the failure.

Further, another object of the invention is achieved by a supervisory and control support equipment in which it is possible to shorten, with high certainty, a period, during which supervision and control of an individual facility is delayed.

The above-described object is achieved by a supervisory and control support equipment characterized in performing a processing related to supervision and control on a plurality of facilities, writing information generated during the procedure of the processing and respectively corresponding to the facilities, to a secondary storage through a cache memory, and saving the information held in the cache memory in an external storage when a predetermined event is recognized during the procedure of the processing.

In the supervisory and control support equipment, the supervisory control information is saved in the external storage with high efficiency and certainty even during a period in which the secondary storage is not normally operated.

The above-described object is achieved by the supervisory and control support equipment characterized in that the predetermined event is given as a demand from the exterior.

In the supervisory and control support equipment, the supervisory control information is pertinently saved in the external storage at moments adaptable to the form of maintenance and operations regardless of the operating states of the secondary storage.

Therefore, service quality is enhanced along with efficiency and flexibility of work relevant to its maintenance and operations.

Furthermore, the above-described object is achieved by the supervisory and control support equipment characterized in that the predetermined event is given as a point in time at a predetermined frequency.

In the supervisory and control support equipment, the latest supervisory control information held in a cache memory is repeatedly saved at the predetermined frequency.

Consequently, as long as the frequency is set to a proper value with desired accuracy, the moment at which the latest supervisory control information above is saved in the external storage is firmly given without a dedicated processing added to the procedure of the processing relevant to supervision and control, and the configuration of the software can be simplified.

The above object is achieved by the supervisory and control support equipment characterized in that both or either one of the function and load of the processing relevant to the supervision and control is distributed to a plurality of management objects, the predetermined event is analyzed, and there is provided a supplemental processing section which demands a management object adaptable to the result of the analysis, of the management objects, to save information held in the cache memory in the external storage.

The supervisory and control support equipment is constructed by distributing the function and the load to modularized management objects adaptable to a configuration of a system which becomes an object of supervision and control.

Therefore, the configuration of software is standardized and flexibility in the variations of the configuration of the system which becomes the object of supervision and control is enhanced.

Moreover, the above-described object is achieved by the supervisory and control support equipment characterized in that the supplemental processing section is constructed of a module distinct from the plurality of objects.

In the supervisory and control support equipment, the supplemental processing section is constructed of a module distinct from a plural n of management objects.

In other words, these management objects does not include the processing to be performed by a supplemental processing section at all, so modularization is achieved at a high degree and reliability is improved along with flexibility in variations of the configurations of the system.

The above-described object is achieved by the supervisory and control support equipment characterized in that a secondary storage reflects information stored as a file according to the recovery of the secondary storage.

In the supervisory and control support equipment, even when failure occurs in the secondary storage, interruption to supervision and control is avoided and the recovered secondary storage is promptly included in an active facility with high certainty as long as all of the updated supervisory control information is saved in the external storage.

The above-described object is achieved by the supervisory and control support equipment characterized in that according to the restart or recovery of a facility, information corresponding to the facility, of information stored as files, is given to the storage media, communication media, or other media supplied for information interchanging with the facility.

In the supervisory and control support equipment, the information given to the above-described media includes all the supervisory control information to be updated on a specific facility after a point in time at which a failure has occurred at the specific facility.

Therefore, even when the failure occurs in any one of the plural n of facilities, the facility promptly becomes an object of supervision and control with high certainty when recovered from the failure as long as all the updated supervisory control information is saved in the external storage.

Furthermore, the above-described object is achieved by the supervisory and control support equipment characterized in that when any facility, of the plurality of facilities, is to be excluded from the configuration of the system, information to be transmitted to the facility is stored as a file in the external storage.

In the supervisory and control support equipment, the information to be transmitted to the facility based on the procedure of supervision and control is sequentially stored in the external storage of the facility excluded from the configuration of the system.

Therefore, as long as the information stored in this way is readable, the corresponding facility is firmly included in the configuration of the system by applying the information.

The above-described object is achieved by the supervisory control equipment characterized in that according to the restart or recovery of a facility, information corresponding to the facility, of information stored as files, is given to the facility.

In the supervisory and control support equipment, the facility which has recovered from a failure can smoothly transit to a normal operating state based on the information given in this way.

Therefore, it is possible to shorten, with high certainty, a period, during which the supervision and control are delayed in any one of the plural n of facilities.

The nature, principle, and utility of the invention will be more apparent from the following detailed description when read in conjunction with the accompanying drawings in which like parts are designated by identical reference numbers.

BRIEF DESCRIPTION OF THE DRAWINGS

FIG. 7 is a diagram showing a configuration example of a conventional supervision and control system; and FIG. 8 is a diagram showing a configuration example of software installed in the supervisory and control support equipment.

DESCRIPTION OF THE PREFERRED EMBODIMENT

First, the principle of a supervisory and control support equipment will be explained according to the invention.

Figure 1:
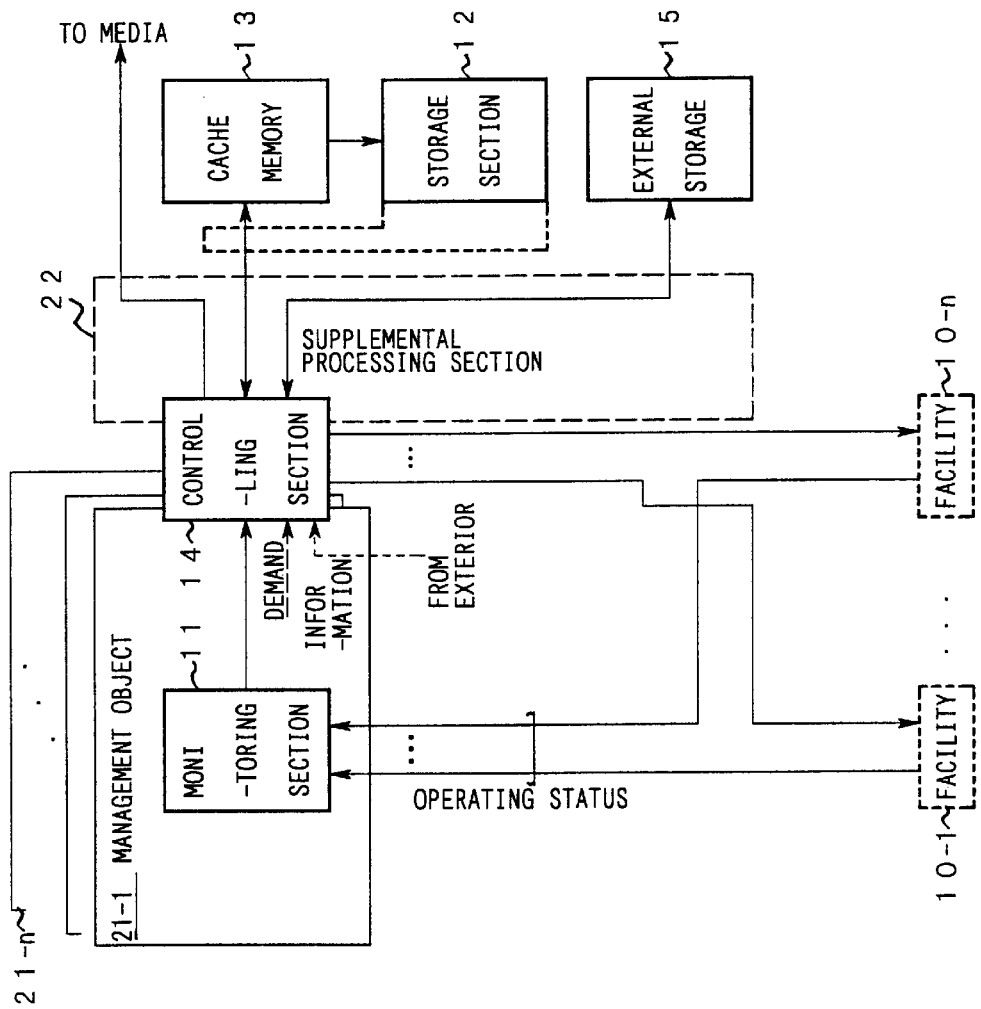
FIG. 1 is diagram showing a principle of a supervisory and control support equipment according to the invention.

FIG. 1 is a diagram showing the principle of a supervisory and control support equipment according to the invention.

The supervisory and control support equipment shown by FIG. 1 is configured with a monitoring section 11, a storage section 12, a cache memory 13, a controlling section 14, an external storage 15 and management objects 21-1 through 21-n.

The first principle of the supervisory and control support equipment according to the invention is as follows.

The monitoring section 11 collects operating status of a plural number "n" of facilities 10-1 through 10-n. The controlling section 14 analyzes the operating status collected by the monitoring section 11 and performs a control suited for a result of the analysis in the cache memory 13 applied to writing of the storage section 12 and the plural number "n" of the facilities 10-1 through 10-n and stores supervisory control information generated or updated in the procedure of the analysis to the storage section 12 via the cache memory 13.

The external storage section 15 is constructed of hardware distinct from the storage section 12 and can write and read under main guidance of the controlling section 14. When the controlling section 14 recognizes predetermined event in the procedure of the processing of realizing the analysis or the control, the control section 14 saves the supervisory control information stored in the cache memory 13 in the external storage 15.

Operation of the supervisory and control support equipment having such a configuration is as follows.

With regard to the plural number "n" of the facilities 10-1 through 10-n, the monitoring section 11 collects the operating status and the controlling section 14 analyzes the operating status and performs a control suited for the result. Further, the controlling section 14 stores the supervisory control information generated or updated in the procedure of the analysis to the storage section 12 via the cache memory 13.

When the controlling section 14 recognizes the predetermined event in the procedure of the processing of realizing the analysis or the control, mentioned above, the controlling section 14 saves the supervisory control information stored in the cache memory 13 in the external storage 15.

Such an external storage 15 is configured with hardware distinct from the storage section 12 and is written and read on the initiative of the controlling section 14. The latest supervisory control information written in the storage section 12 is stationarily held in the cache memory 13.

Therefore, the supervisory control information is saved in the external storage 15 efficiently and with high certainty even in a time period in which the storage section 12 is not normally operated.

The second principle of the supervisory and control support equipment according to the invention is as follows.

The control section 14 recognize a demand given from outside and adaptable to form of maintenance or operation of the plural number "n" of the facilities 10-1 through 10-n as a predetermined event.

Operation of the supervisory and control support equipment having such a configuration is as follows.

The supervisory control information is pertinently saved in the external storage 15 regardless of the operating state of the storage section 12 at a moment adaptable to the form of maintenance and operations.

Therefore, the service quality is enhanced along with the efficiency and the flexibility of operations relevant to its maintenance and operations.

The third principle of the supervisory and control support equipment according to the invention is as follows.

The controlling section 14 recognizes a point in time signifying a frequency adaptable to the form of maintenance or operations of the plural number "n" of facilities 10-1 through 10-n in an order of time series as a predetermined event.

Operation of the supervisory and control support equipment having such a configuration is as follows.

The latest supervisory control information held in the cache memory 13 is saved in the external storage 15 repeatedly at a predetermined frequency.

Therefore, as long as such a-frequency is set to a proper value with desired accuracy, the moment at which the latest supervisory control information is saved in the external storage 15, mentioned above, can certainly be given without a dedicated processing added to the procedure of the processing relevant to the supervision and control the configuration of software can be simplified.

The fourth principle of the supervisory and control support equipment according to the invention is as follows.

The monitoring section 11 and the controlling section 14 collect and analyze the operating status individually with regard to the plural number "n" of facilities 10-1 through 10-n. Further, the monitoring section 11 and the controlling section 14 are configured as a supplemental processing section 22 recognizing a predetermined event and demanding the plural number "n" of management objects 21-1 through 21-n performing a control suited for a result of the analysis and management objects adaptable to the predetermined event among these control objects 21-1 through 21-n, to save the supervisory control information held in the cache memory 13 to the external storage 15.

Operation of the supervisory and control support equipment having such a configuration is as follows.

The supervisory and control support equipment according to the invention is configured by distributing function and load to the modularized management objects 21-1 through 21-n adaptable to a configuration of a system which becomes an object of supervision and control.

Accordingly, the configuration of software is standardized and flexibility relevant to the configuration of the system which becomes the object of the supervision and control is enhanced.

The fifth principle of the supervisory and control support equipment according to the invention is as follows.

The supplemental processing section 22 is configured as a module distinct from the plurality of management objects 21-1 through 21-n.

Operation of the supervisory and control support equipment having such a configuration is as follows.

The management objects 21-1 through 21-n are not integrated with the processing to be performed by the supplemental processing section 22, accordingly, the modularization is highly achieved and the reliability is improved along with the flexibility with regard to a change in the configuration of the system.

The sixth principle of the supervisory and control support equipment according to the invention is as follows.

When the controlling section 12 is recovered from failure, the controlling section 14 restores the supervisory control information to be stored to the storage section 12 by information saved in the external storage 15.

Operation of the supervisory and control support equipment having such a configuration is as follows.

The information saved in the external storage 15 is incorporated with all of the supervisory control information which has been updated after a point in time at which the failure occurred in the storage section 12.

Therefore, even in the case in which the failure occurred in the storage section 12, as long as all of the updated supervisory control information is saved in the external storage 15, interruption to supervision and control is avoided and the recovered storage section 12 is promptly included in an active facility with high certainty.

The seventh principle of the supervisory and control support equipment according to the invention is as follows.

When a specific facility recovers or is started among the plural number "n" of the facilities 10-1 through 10-n, the controlling section 14 outputs information corresponding to the specific facility in information saved in the external storage 15 to media applied to information interchange with the specific facility.

Operation of the supervisory and control support equipment having such a configuration is as follows.

Such an information outputted to the media is incorporated with all of the supervisory control information to be updated after a point in time at which failure occurs in the specific facility.

Therefore, even in the case in which the failure occurs at any of the facility in the plural number "n" of facilities 10-1 through 10-n, as long as all of the updated supervisory control information is saved in the external storage 15, the facility becomes the object of supervision and control quickly and with high certainty when recovered.

The eighth principle of the supervisory and control support equipment according to the invention is as follows.

The controlling section 14 determines an event in which any facility among the plural number "n" of facilities 101 through 10-n is to be excluded from the configuration of the system and saves information to be transferred based on the procedure of control to such any facility to the external storage 15 when the event occurs.

Operation of the supervisory and control support equipment having such a configuration is as follows.

With regard to the facility excluded from the configuration of the system, the information to be transferred to the facility according to the procedure of supervision and control is sequentially stored to the external storage 15.

Therefore, as long as the information stored in this way can be read, the relevant facility is firmly included in the configuration of the system by applying the information.

The ninth principle of the supervisory and control support equipment according to the invention is as follows.

The controlling means 14 determines a specific facility which has recovered or started in the plural number "n" of facilities 10-1 through 10-n based on a result of analyzing operating status collected by the monitoring means 11 or information given from outside and informs the specific facility of information saved in the external storage 15 with regard to the specific facility.

Operation of the supervisory and control support equipment having such a configuration is as follows.

The controlling means 14 informs the specific facility of information saved in the external storage 15 with regard to the specific facility, mentioned above.

That is, the facility, which has recovered after failure occurred, can temporarily transit to a normal operating state smoothly according to the information given in such a way.

Therefore, it is possible to shorten a time period in which the supervision and control of the plural number "n" of facilities 10-1 through 10-n are delayed, with high certainty.

A detailed explanation will be given of embodiments of the invention in reference to the drawings as follows.

Further, with regard to respective embodiments, described below, a configuration of hardware is the same as that of the conventional example shown by FIG. 7 and features thereof reside in software installed to the master supervisory and control support equipment 82.

Therefore, in the following, reference is given to drawings indicating the features of configuration of the software along with FIG. 7.

Figure 2:
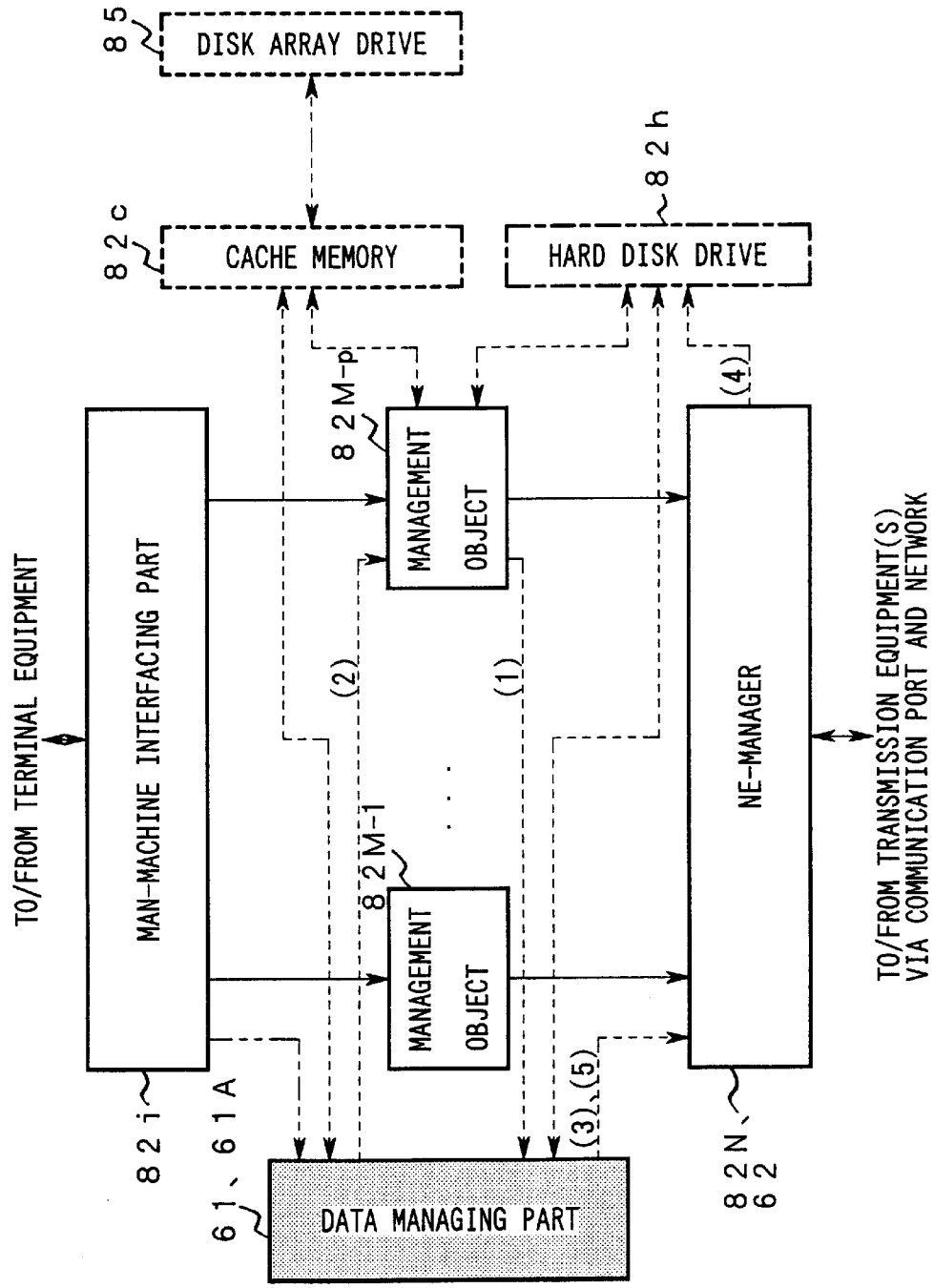
FIG. 2 is a diagram showing the first through the fourth embodiment according to the invention.

FIG. 2 is a diagram showing a first through a fourth embodiment according to the invention.

In the drawing, elements having function and configuration the same as those in the conventional example shown by FIG. 8 are indicated by attaching the same numerals and an explanation thereof will be omitted here.

The difference in configuration of software between the embodiment and the conventional example resides in that as shown in FIG. 2 with half-tone dot meshing, there is added a data control part 61 as a task (process) that cooperates with all or pieces of the management objects 82M-1 through 82M-p (assumed here that only the management object 82-p is existed for simplicity).

Figure 3:
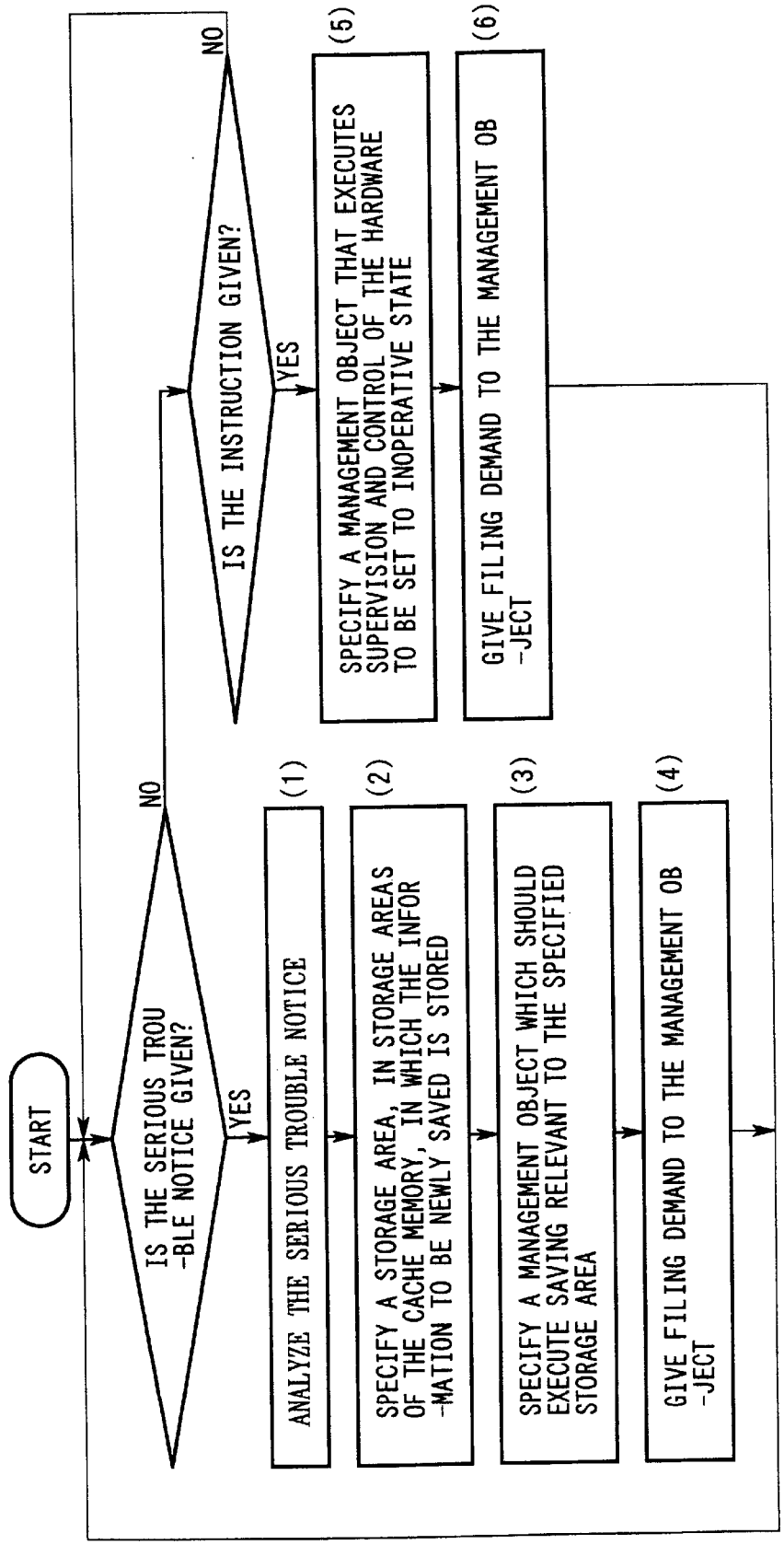
FIG. 3 is a flowchart showing the operation of the first and the second embodiments according to the invention.

FIG. 3 is a flowchart showing operation of the first and the second embodiments according to the invention.

The operation of the first and the second embodiments will be explained in the following according to the invention in reference to FIG. 2, FIG. 3 and FIG. 7.

When writing of some information to the disk array drive 85 is needed, the management object 82M-p demands the writing by invoking predetermined system call to an operating system.

Argument of such a system call includes, with regard to information to be an object of writing:
 a pointer indicating a stored area on main memory;
 information content;
 identification information of a file to which writing is performed;
 a form of updating to be performed to the file; and so on. However, type and content of these has no relation to the invention and therefore, an explanation thereof will be omitted.

The operating system performs file management required for writing to the disk array drive 85 according to the argument included in the system call, mentioned above, and seizes physical areas to which relevant information is to be actually written under the file management.

Further, the operating system invokes a driver (BIOS) providing instruction necessary for writing to these physical areas under predetermined resource control to corresponding hardware, for example, a circuit interfacing with an SCSI bus underlaid between the equipment and the disk array drive 85.

The driver invoked in this way, writes the above-described information to the disk array drive 85 by applying a cache memory installed to the master supervisory and control support equipment 82 as a disk cache. (hereinafter acode "82c" is added for simplicity)

Therefore, there is stationarily held at the cache memory 82c, latest supervisory control information as long as the cache memory 82c is provided with a storage area having a size exceeding maximum information content of information which the disk array drive 85 can hold.

Further, in the procedure of processing relevant to the above-described supervision and control, when the management object 82M-p recognizes that the disk array drive 85 is brought into a state in which updated supervisory control information cannot be held in accordance::with, for example, a status which the operating system informs as a response to the above-described system call, the management object 82M-p informs the data managing part 61 of serious trouble notice including identification information of the state and the management object 82M-p and indicating thereof(FIG. 2(1)).

When the data managing part 61 recognizes the serious trouble notice, the data managing part 61 analyzes the serious trouble notice according to an algorism adaptable to the configuration of the system at the point in time (FIG. 3(1)) thereby specify a storage area, in storage areas of the cache memory 82c, in which the information to be newly saved is stored (FIG. 3(2)).

Furthermore, the data managing part 61 specifies a management object which is the most desirable for performing processing to realize saving relevant the specified storage area in a leading manner among the management objects 82M-1 through 82M-p (FIG. 3(3))(assumed here as indicated as code "82M-p" for simplicity)

The data managing part 61 gives filing demand including a pointer of a storage area, in the storage area of the cache memory 82c in which the desired saving information is stored to the management object 82M-p(FIG. 2(2), FIG. 3(4)).

Further, the serious trouble notice and the filing demand, mentioned above, as long as both are firmly delivered between the management objects 82M-1 through 82M-p and the data managing part 61 may be:
 mail or semaphore applied to communication and synchronization between tasks processes under supervision of the operating system;
 flag delivered via predetermined storage area of the main storage or the disk drive by an application program;
 or any other information.

When the management object 82M-p recognizes the above-described filing demand, the management object 82M-p sets the priority of the task of the management object 82M-p to a value higher than that of other management object.

Furthermore, the management object 82M-p invokes a system call indicating that a content of a storage area, in the storage region of the cache memory 82c, designated by the pointer included in the filing demand is to be saved in a hard disk drive (hereinafter a code "82h" is added).

As shown by dashed chain lines in FIG. 2, the hard disk drive 82h is provided to the master supervisory and control support equipment 82 as an external storage distinct from the disk array drive 85. Further, the hard disk drive 82h is accessed as storage media pertinently held with information generated in the procedure of processing performed by the master supervisory and control support equipment 82 and referred.

Furthermore, the procedure of file management that is performed by the operating system for the purpose of writing to the hard disk drive 82h in response to the above-described system call and the procedure of a series of processings for invoking the driver under supervision of the file management are the same as those in the case of writing to the disk array drive 85, accordingly, an explanation thereof will be omitted here.

In this way, according to the embodiment, even in a state in which the latest supervisory control information is not held in the disk array drive 85 since a failure occurred in the disk array drive 85, the latest supervisory control information is held, as a predetermined file, in the hard disk drive 82h inherently provided to the master supervisory and control support equipment 82.

Therefore, as long as there is secured an environment in which reading of the file is firmly performed at desired speed, during a period in which recovery of the disk array drive 85 is being achieved, configuration of system and continuation of operations are guaranteed and when the recovery has been completed, the latest supervisory control information at the point in time is quickly written to the disk array drive 85.

Further, according to a transmission system to which the invention is applied, labor in work relevant to its maintenance and operations is saved and general reliability is highly maintained.

Further, according to the embodiment, the moment at which saves the content of the cache memory 82c in the hard disk drive 82h is not limited to the point in time at which failure occurs but may be, for example, any of:

predetermined command given via the man-machine interfacing part 82i;

predetermined event recognized in process of processing relevant to supervision and controls; or time providing a predetermined period or frequency.

Further, although according to the embodiment, distribution of both or either one of function and load relevant to supervision and control is achieved with regard to the management objects 82M-1 through 82M-p, when distribution of these function and load is achieved in a desired form, the invention can be realized also by software configured without being provided with the management objects 82M-1 through 82M-p.

The operation of the second embodiment according to the invention will be explained in the following in reference to FIG. 2, FIG. 3 and FIG. 7.

The difference between the embodiment and the above-described first embodiment resides in a procedure of processing, shown below, which the data managing part 61 performs in cooperation with the man-machine interfacing part 82i.

In the case in which a state of any part of hardware (subsystem(s), frame(s)(rack(s), shelves, module(s) (package(s)) becoming an object of supervision and control performed by any of the management objects 82M-1 through 82M-p, is set to an inoperative state according to a demand given by an operator via a terminal equipment(not illustrated) and the part is to be excluded from the configuration of the system, as shown by a chain double-dashed line in FIG. 2, the man-machine interfacing part 82i delivers an instruction meaning thereof to the data managing part 61.

Assumed that such an instruction is delivered as mail, semaphore, flag or the like similar to the serious trouble notice and filing demand, described above.

When the data managing part 61 recognizes the instruction, the data managing part 61 specifies a management object, that is, among the management objects 82M-1 through 82M-p, designated by information included in the instruction and performs supervision and control of the specific hardware to be set to the above-described inoperative state(FIG. 3(5)).

The data managing part 61 informs the management object of filing demand indicating that only the supervisory control information with regard to the above-described specific hardware is to be saved in the hard disk drive 82h(FIG.2(2), FIG. 3(6).

That is, the supervisory control information with regard to the specific hardware to transit to a state inoperative as neither of an active facility and a standby facility is firmly stored to a specific storage area of the hard disk drive 82h.

In this way, according to the embodiment, when the above-described specific hardware is integrated again to the configuration of the system and shifts to the operating state, the proper supervisory control information can firmly be delivered to the specific hardware.

Therefore, in comparison with the conventional example in which such supervisory control information is not delivered at all, the state of individual hardware is stably secured without rapidly varying even in process of various work performed in the procedure of maintenance and operations.

The third embodiment according to the invention will be explained in the following.

The difference of configuration between the embodiment and the first and the second embodiments, mentioned above, resides in that a data managing part 61A is provided in place of the data managing part 61.

Further, the data managing part 61A performs processings, mentioned later, along with processings performed by the data managing part 61.

Therefore, with regard to the processings performed by the data managing part 61 in the first and the second embodiments, mentioned above, in the following, an explanation thereof will be omitted.

Figure 4:
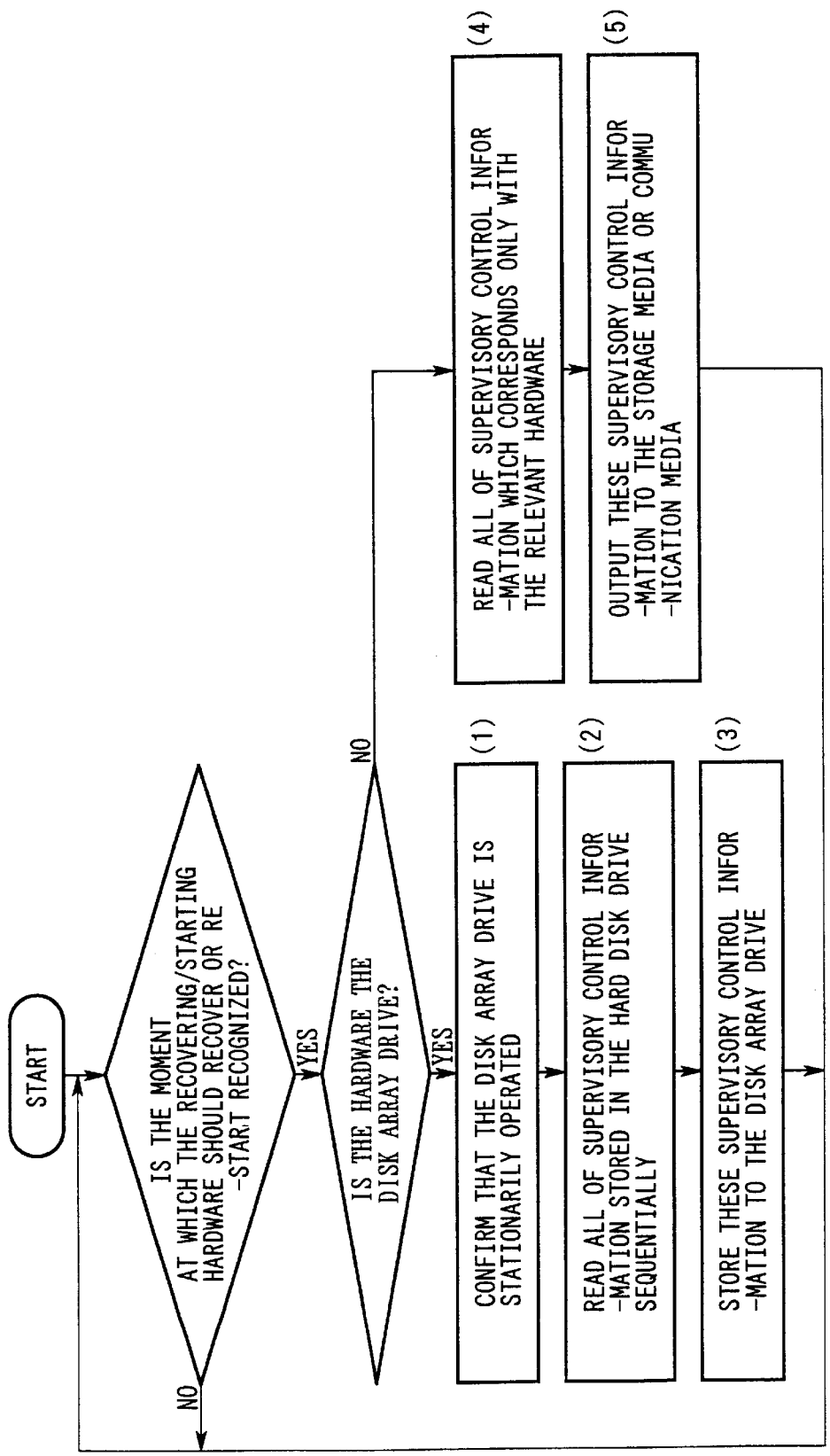
FIG. 4 is a flowchart showing the operation of the third embodiment according to the invention.

FIG. 4 is a flowchart showing the operation of the third embodiment according to the invention.

The operation of the third embodiment according to the invention will be explained in reference to FIG. 2, FIG. 4 and FIG. 7 as follows.

The data managing part 61A recognizes a moment at which either one of hardware (transmission equipments 81-1~81-n or the component of the transmission equipments 81-1~81-n) of which supervisory and control is to be individually performed by the management objects 82M-1 through 82M-p or the disk array drive 85(hereinafter referred to as recovering/starting hardware) has recovered from a failed state or is to be restarted.

Besides, such a moment is recognized as, for example, a message given via the man-machine interfacing part 82-i or an event detected according to the procedure of supervision and control.

When the data managing part 61A recognizes the above-described moment, in the case in which the relevant recovering/starting hardware is the disk array drive 85, the data managing part 61A confirms that the disk array drive 85 is stationarily operated(FIG. 4(1)), sequentially reads all of supervisory control information stored in the hard disk drive 82*h* as a file(FIG. 4(2)) and invokes a system call which is a demand for storing these supervisory control information to a corresponding area of the disk array drive 85(FIG. 4(3)).

However, when the recovering/starting hardware is not the disk array drive 85 but corresponds to hardware (transmission equipments 81-1~81-n or the component of the transmission equipments 81-1~81-n)of which supervision and control is to be performed individually by the management objects 82M-1 through 82M-p, the data managing part 61A sequentially reads all of supervisory control information in which corresponds only with the relevant hardware, in the supervisory control information stored in the hard disk drive 82*h* as a file, writes the information to a desired storage media (for example, a removable floppy disk or MO not illustrated) or invokes a system call which is a demand of transmitting the information to a communication link formed via the network 84 between the master supervisory and central support equipment 82 and a transmission equipment mounted with the hardware among the transmission equipments 81-1 through 81-n.

That is, according to the embodiment, the supervisory control information saved in the hard disk drive 82*h* that is an external storage as a substitution of the disk array drive 85 under application of the invention, is automatically applied to the recovered or started hardware or is provided via the storage media enabling the application.

Therefore, the supervisory control information including office data and subscriber data is flexibly and quickly applied to the updated configuration of the system and efficiency and certainty of maintenance and application are enhanced.

Figure 5:
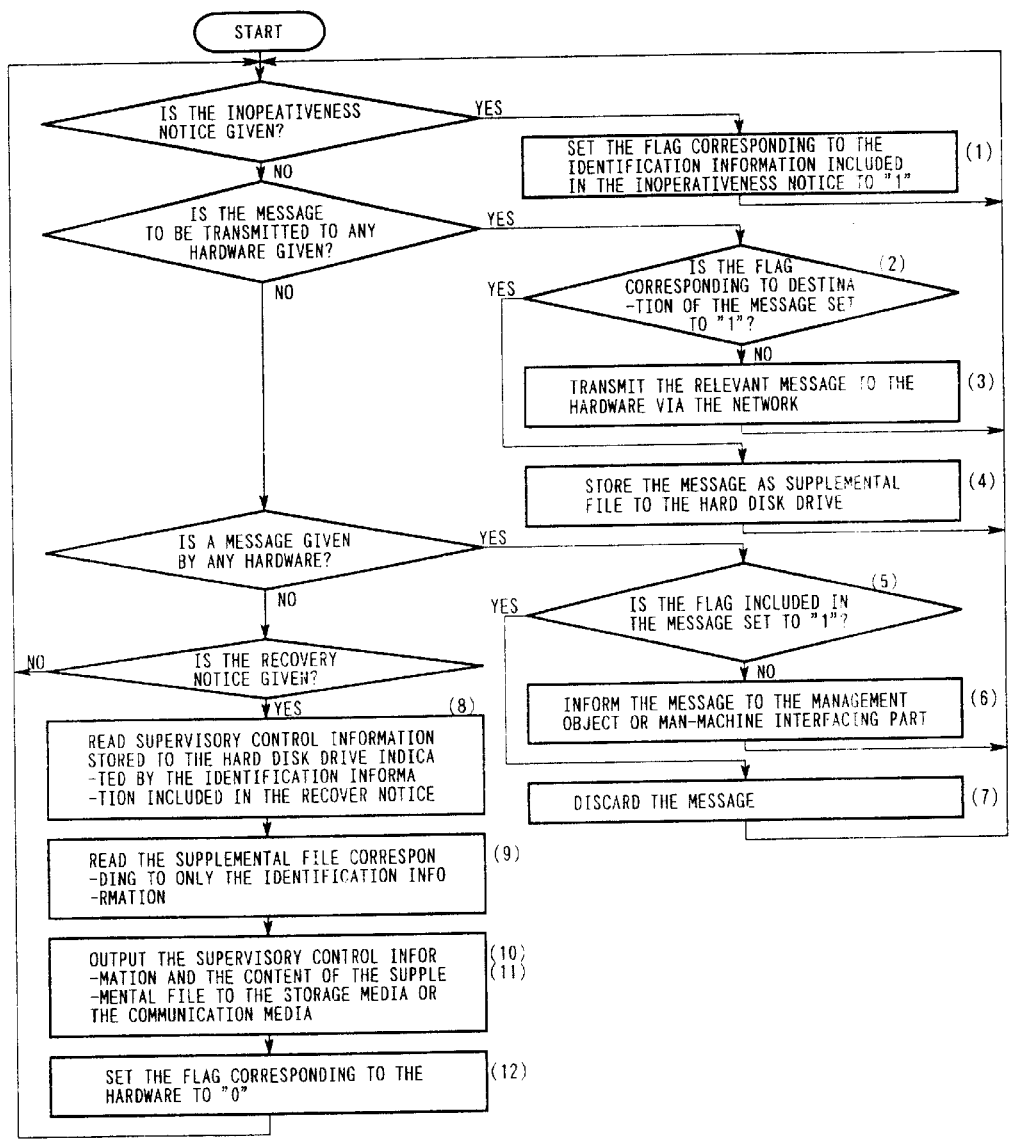
FIG. 5 is a flowchart showing the operation of the fourth embodiment according to the invention.

FIG. 5 is a flowchart showing the operation of the fourth embodiment according to the invention.

Operation of the fourth embodiment according to the invention will be explained in reference to FIG. 2 through FIG. 5.

The feature of the embodiment resides in that an NE-manager 62 is provided in place of the NE-manager 82N and the NE-manager 62 performs the following processings in cooperation with the data managing part 61 along with the processings performed by the NE-manager 82N.

When any of hardware(subsystem, frame(rack), shelf, or module(package)) being an object of supervision and control performed by the management objects 82M-1 through 82M-p, occurrence of failure or transition to inoperative state is informed by an operator via the man-machine interfacing part 82*i* or the management objects 82M-1 through 82M-p, the data managing part 61 generates an inoperativeness notice containing identification information of the relevant hardware and informs the NE-manager 62 of the inoperativeness notice(FIG. 2(3)).

The NE-manager 62 is provided with a flag individually corresponding to the above-described hardware and initializes a logical value of the flag to "0" in starting.

When the NE-manager 62 recognizes the inoperativeness notice given by the data managing part 61, the NE-manager 62 sets a logical value of a flag corresponding to identification information contained in the inoperativeness notice to "1"(FIG. 5(1)).

Meanwhile, the man-machine interfacing part 82*i* and the management objects 82M-1 through 82M-p perform predetermined processings pertinently in cooperation with each other even in a time period in which failure occurs at some hardware.

When a message to be transmitted to any of the hardware is given by the man-machine interfacing part 82*i* or the management objects 82M-1 through 82M-p, the NE-manager 62 determines whether a logical value of a flag corresponding to a destination of the message is 1.

Furthermore, when a result of the determination is false, the NE-manager 62 performs no special processing and transmits a relevant message to desired hardware(any one of transmission equipments 81-1~81-n) opposed thereto via the network 84.

Figure 6:
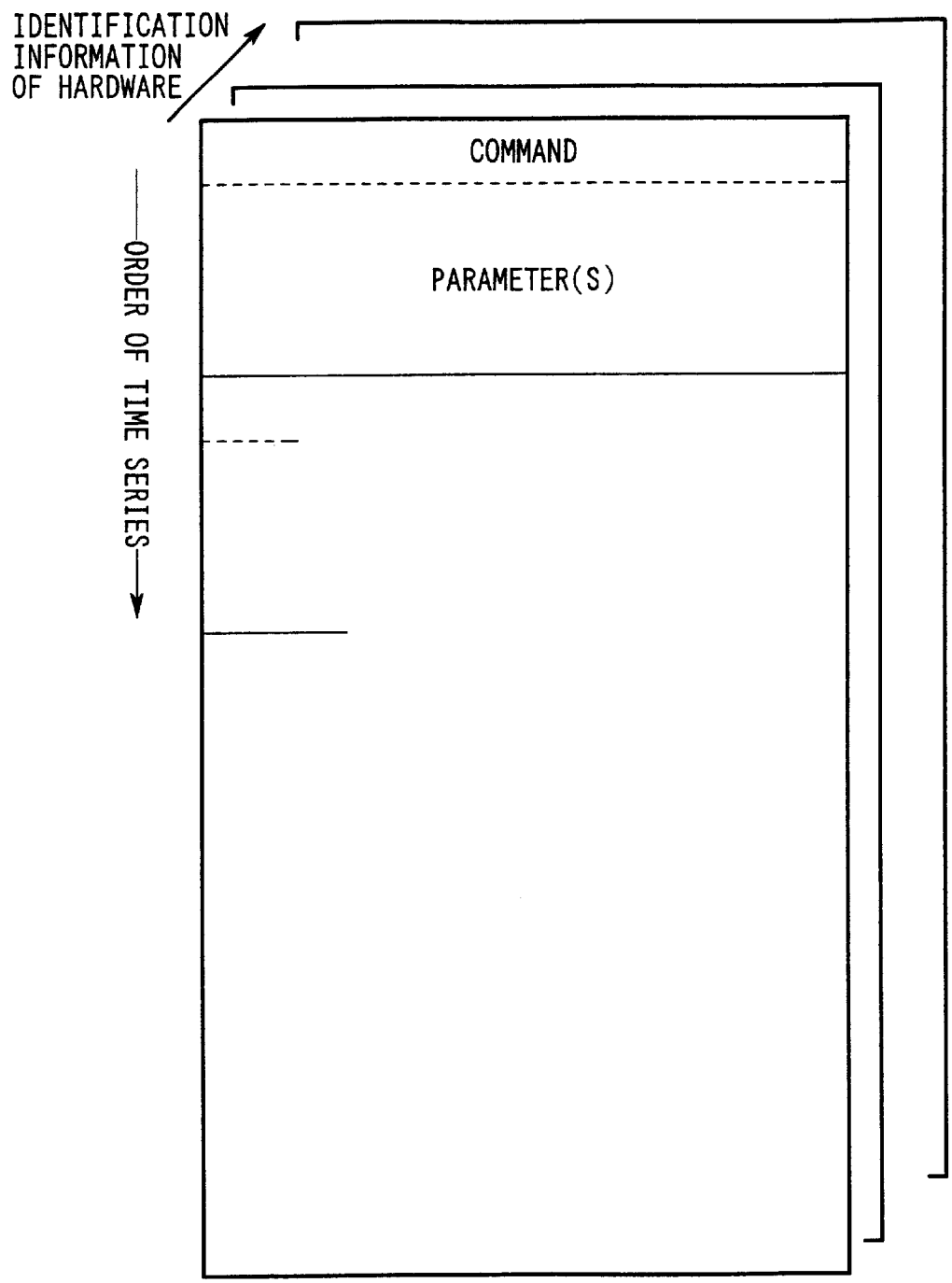
FIG. 6 is a diagram showing a configuration of a supplementary file.

However, when the result of the above-described determination is true, the NE-manager 62 pararelizes the relevant message to identification information of hardware to be the destination, packs thereof in the order of time series and invokes a system call to thereby sequentially store thereof to the hard disk drive 82*h* as files(hereinafter referred to as supplementary file) shown by FIG. 6(FIG. 2(4), FIG. 5(4)).

With regard to processings performed by the operating system and the driver in cooperation with each other to perform writing to the hard disk drive 82*h* in response to such a system call, a description has already given thereto, accordingly, an explanation thereof will be omitted here.

Further, when a message including identification information of some hardware is given from the hardware to the NE-manager 62 via the network 84, the NE-manager 62 determines whether a logical value of a flag corresponding to the hardware designated by the identification information included in the identification information of the message is 1(FIG. 5(6)).

Furthermore, when the result of the determination is false, the NE-manager 62, without performing any special processing and informs the relevant message to the management objects 82M-1 through 82M-p or the man-machine interfacing part 82I(FIG.5(6)).

However, when the result of the determination is true, the NE-manager 62 discards the relevant message(FIG. 5(7)).

Meanwhile, when any of hardware(subsystem, frame (rack), shelf, or module(package)) which becomes an object of supervision and control performed by the management objects 82M-1 through 82M-p, recovery from failure or starting is informed by an operator via the man-machine interfacing part 82*i* or recovery is informed by the management objects 82M-1 through 82M-p, the data managing part 61 generates a recovery notice including identification information of the relevant hardware and informs the recovery notice to the NE-manager 62(FIG. 2(5)).

The NE-manager 62 reads supervisory control information stored in the hard disk drive 82*h* with regard to recovering/starting hardware indicated by the identification information similar to the third embodiment, described above (FIG. 5(8))and reads a supplementary file corresponding to only the identification information along with the supervisory control information(FIG. 5(9)).

By invoking a predetermined system call, the NE-manager 62 writes content of the read supervisory control information as well as supplementary file to desired storage media(FIG. 5(10)), or transmits the content to the communication link formed between the NE-manager 62 and a transmission equipment mounted with relevant hardware in the transmission equipment 81-1 through 81-n via the network 84(FIG. 5(11)) and sets a logical value of a flag corresponding to the hardware to "0"(FIG. 5(12).

Therefore, according to the embodiment, when hardware in which failure occurred or which transits to an inoperative state is recovered or started, the hardware can transit to a state that is substitutable as an active device quickly and with high certainty.

Although, in the above-described respective embodiments, there is applied an active redundancy system to the disk array drive 85, even in the case in which the redundancy system is not applied to the disk array drive 85 at all or the disk array drive 85 is configured redundantly according to any form, the invention is applicable.

Furthermore, in the above-described respective embodiments, the procedure of processings relevant to supervision and control to be performed inherently by the management objects 82M-1 through 82M-p is not described in details.

However, when the management objects 82M-1 through 82M-p are adaptable to a configuration of a system to which supervision and control is to be performed and to a system of maintenance and operations to be applied, load and function may be distribute, regardless of operand and procedure of computing operation, in any interactive form of the man-machine interfacing part 82i, the NE-manager 82N or 62 and the data managing part 61 or 61A.

Although, in the above-described respective embodiments, the management objects 82M-1 through 82M-p are configured as individual tasks processes, the management objects 82M-1 through 82M-p may be realized by, for example, subroutine or in any other form.

Moreover, in the above-described respective embodiments, the invention is applied to supervision and control of the transmission system including the transmission equipments 81-1 through 81-n.

However, the invention is not limited to such a transmission system but is applicable to any system as long as a predetermined function distribution or load distribution is achieved and which comprises a plurality of facilities cooperating with each other.

Further, although, in the above-described respective embodiments, the data managing parts 61 or 61A is configured as task(process) distinct from the management objects 82M-1 through 82M-p, the data managing part 61 may be integrated to all or portions of the man-machine interfacing part 82i, the NE-manager 82N or 62 and the management objects 82M-1 through 82M-p with desired load distribution or functional distributed.

In the above-described respective embodiments, detailed items of the supervisory control information are not disclosed. However, the present invention is applicable regardless of type of supervisory control information and items to be included in the supervisory control information.

Further, in the above-described respective embodiments, the invention is realized as software performed by a processor (not shown) provided to the master supervisory and control support equipment 82.

However, all or portions of processings performed as such software may be realized by an exclusive hardware.

The invention is not limited to the above embodiments various modifications are possible without departing from the spirit and scope of the invention. Any improvements may be made in part or all of the components.

What is claimed is:

1. A supervisory control support equipment, comprising:
   a monitoring means for monitoring an operating status of a plural n of facilities whose functions are distributed;
   a storage means;
   a cache memory applied to a writing to said storage means;
   a controlling means for analyzing an operating status of said plural n of facilities monitored by said monitoring means, and performing a control suited for the result of said analyzing and for holding supervisory control information in said storage means through said cache memory, the supervisory control information being generated or updated during the process of said analyzing and to be applied to update of a system configuration under the control; and
   an external storage configured as hardware distinct from said storage means and is readable and writeable on demand of said control means, wherein said control means saves supervisory control information held in said cache memory in said external storage when a predetermined event is recognized in the process of realizing said analysis or said control.

2. A supervisory control support equipment according to claim 1, wherein said predetermined event identified by said controlling means is a demand given from the exterior and adaptable to the form of maintenance or operations of said plural n of facilities.

3. A supervisory control support equipment according to claim 1, wherein said predetermined event identified by said controlling means is a point in time which signifies in the order of time sequence the frequency adaptable to the form of maintenance or operations of said plural n of facilities.

4. A supervisory control support equipment according to claim 1, wherein
   said monitoring means and said controlling means are constructed of a plural n of management objects for individually monitoring and analyzing said operating status of said plural n of facilities, to perform a control suitable for the result of the analysis and
   supplemental processing means for identifying said predetermined event and demanding a management object adaptable to the predetermined event, of said management objects, to save, in said external storage, supervisory control information held in said cache memory.

5. A supervisory control support equipment according to claim 1, wherein said controlling means restores supervisory control information to be held in said storage means with information saved in the said external storage when said storage means is recovered from failure.

6. A supervisory control support equipment according to claim 1, wherein said controlling means gives to a medium used for information interchanging with a specific facility, information corresponding to said specific facility, of information saved in said external storage, when said specific facility, of said plural n of facilities, is recovered or started.

7. A supervisory control support equipment according to claim 1, wherein said controlling means discriminates an event where any facility, of said plural n of facilities, should be excluded from a configuration of a system, and
   saves in said external storage information which should be transmitted to said any facility according to the procedure of said control when said event occurs.

8. A supervisory control support equipment according to claim 2, wherein said controlling means restores supervisory control information to be held in said storage means with information saved in the said external storage when said storage means is recovered from failure.

9. A supervisory control support equipment according to claim 2, wherein said controlling means gives to a medium used for information interchanging with a specific facility, information corresponding to said specific facility, of information saved in said external storage, when said specific facility, of said plural n of facilities, is recovered or started.

10. A supervisory control support equipment according to claim 2, wherein said controlling means discriminates an event where any facility, of said plural n of facilities, should be excluded from a configuration of a system, and saves in said external storage information which should be transmitted to said any facility according to the procedure of said control when said event occurs.

11. A supervisory control support equipment according to claim 3, wherein said controlling means restores supervisory control information to be held in said storage means with information saved in the said external storage when said storage means is recovered from failure.

12. A supervisory control support equipment according to claim 3, wherein said controlling means gives to a medium used for information interchanging with a specific facility, information corresponding to said specific facility, of information saved in said external storage, when said specific facility, of said plural n of facilities, is recovered or started.

13. A supervisory control support equipment according to claim 3, wherein said controlling means discriminates an event where any facility, of said plural n of facilities, should be excluded from a configuration of a system, and
saves in said external storage information which should be transmitted to said any facility according to the procedure of said control when said event occurs.

14. A supervisory control support equipment according to claim 4, wherein said supplemental processing means is constructed of a module distinct from said plural n of management objects.

15. A supervisory control support equipment according to claim 4, wherein said controlling means restores supervisory control information to be held in said storage means with information saved in the said external storage when said storage means is recovered from failure.

16. A supervisory control support equipment according to claim 4, wherein said controlling means gives to a medium used for information interchanging with a specific facility, information corresponding to said specific facility, of information saved in said external storage, when said specific facility, of said plural n of facilities, is recovered or started.

17. A supervisory control support equipment according to claim 4, wherein said controlling means discriminates an event where any facility, of said plural n of facilities, should be excluded from a configuration of a system, and
saves in said external storage information which should be transmitted to said any facility according to the procedure of said control when said event occurs.

18. A supervisory control support equipment according to claim 5, wherein said controlling means discriminates an event where any facility, of said plural n of facilities, should be excluded from a configuration of a system, and
saves in said external storage information which should be transmitted to said any facility according to the procedure of said control when said event occurs.

19. A supervisory control support equipment according to claim 7, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

20. A supervisory control support equipment according to claim 8, wherein said controlling means discriminates an event where any facility, of said plural n of facilities, should be excluded from a configuration of a system, and
saves in said external storage information which should be transmitted to said any facility according to the procedure of said control when said event occurs.

21. A supervisory control support equipment according to claim 10, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

22. A supervisory control support equipment according to claim 13, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

23. A supervisory control support equipment according to claim 14, wherein said controlling means restores supervisory control information to be held in said storage means with information saved in the said external storage when said storage means is recovered from failure.

24. A supervisory control support equipment according to claim 14, wherein said controlling means gives to a medium used for information interchanging with a specific facility, information corresponding to said specific facility, of information saved in said external storage, when said specific facility, of said plural n of facilities is recovered or started.

25. A supervisory control support equipment according to claim 14, wherein said controlling means discriminates an event where any facility, of said plural n of facilities, should be excluded from a configuration of a system, and
saves in said external storage information which should be transmitted to said any facility according to the procedure of said control when said event occurs.

26. A supervisory control support equipment according to claim 17, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

27. A supervisory control support equipment according to claim 18, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

28. A supervisory control support equipment according to claim 20, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

29. A supervisory control support equipment according to claim 25, wherein said controlling means discriminates a specific facility, of said plural n of facilities, recovered or started based on the result of the analysis on a operating status monitored by said monitoring means, or on information given from said exterior, and
gives to said specific facility information on said specific facility saved in said external storage.

* * * * *